US006345769B2

(12) United States Patent
MacIntyre

(10) Patent No.: US 6,345,769 B2
(45) Date of Patent: Feb. 12, 2002

(54) WATER HEATING APPARATUS WITH SENSIBLE AND LATENT HEAT RECOVERY

(75) Inventor: Kenneth R. MacIntyre, Oakville (CA)

(73) Assignee: Canadian Gas Research Institute, Richmond Hill (CA)

( * ) Notice: Subject to any disclaimer, the term of this patent is extended or adjusted under 35 U.S.C. 154(b) by 0 days.

(21) Appl. No.: 09/835,364

(22) Filed: Apr. 17, 2001

Related U.S. Application Data

(60) Provisional application No. 60/197,691, filed on Apr. 17, 2000.

(51) Int. Cl.[7] .......... F24D 3/00
(52) U.S. Cl. .......... 237/8 R
(58) Field of Search .......... 237/16, 19, 8 R, 237/8 B, 56

(56) References Cited

U.S. PATENT DOCUMENTS 4,848,655 A * 7/1989 Woodin et al. .......... 237/8 R
5,772,113 A * 6/1998 Gerstmann et al. .......... 237/8 R
5,881,952 A 3/1999 MacIntyre

FOREIGN PATENT DOCUMENTS

CA 2125070 12/1995

* cited by examiner

*Primary Examiner*—Harold Joyce
*Assistant Examiner*—Derek S. Boles
(74) *Attorney, Agent, or Firm*—Dolly Kao; Rideout & Maybee

(57) ABSTRACT

A water heating apparatus having structure for recovering sensible and latent heat from flue gases generated in a heater thereof and transferring the heat to water to be heated. The apparatus has a closed circuit for liquid, such as water, in which are positioned two heat exchangers. One of the heat exchangers is positioned in the heater of the apparatus for transferring heat from a burner of the heater to liquid in the closed circuit. The other heat exchanger is positioned in a water pass-through system to heat the water therein. The apparatus has an air pass-through system for carrying flue gases from the heater out an exhaust pipe. The flue gases travel through a third heat exchanger positioned in the water pass-through system whereby sensible and latent heat from the flue gases are transferred to water in the water pass-through system, further heating the water therein.

10 Claims, 1 Drawing Sheet

WATER HEATING APPARATUS WITH SENSIBLE AND LATENT HEAT RECOVERY

This application claims the benefit of U.S. provisional patent application Ser. No. 60/197,691 filed Apr. 17, 2000 pursuant to 35 U.S.C. s. 119(e).

FIELD OF THE INVENTION

The present invention relates to an improved water heating apparatus employing a closed circuit heating system and an open circuit hot water supply system.

BACKGROUND TO THE INVENTION

Hot water heating systems are known. A common system used in North America includes a large water storage tank that has means for heating the water prior to discharge to, for example a sink, shower, washing machine or the like. The water in such storage tanks is usually heated with electric heating coils or by burning hydrocarbon gas. Such storage tanks are advantageous because they can provide large amounts of hot water. In Europe, systems are used for rapidly heating cold water by passing it through a coiled copper tube that is positioned in a heating device. Such systems are relatively efficient but tend to be unable to provide large amounts of hot water. A combination of the two systems is shown in Canadian Patent Application 2125 070 to R. W. Smith which was published on Dec. 1, 1995. Basically, the Smith system uses a separate single-pass heater to supply hot water to a water tank. One of the limitations of the Smith system is the deposition of solids from potable water onto wetted heating surfaces. A method of providing a compact improved apparatus for supplying hot water to a tank and to alleviate the aforementioned deposition of solids is shown in U.S. Pat. No. 5,881,952 to Kenneth R. Macintyre and published on Mar. 16, 1995. The Macintyre system has a closed water circuit heater, and a liquid/liquid heat exchanger to transfer heat from the closed circuit water to pass-through water which is stored in a tank.

The present invention is intended to improve the efficiency of the aforementioned Macintyre system by combining the functions of a liquid/liquid heat exchanger and separate storage tank, in a single storage tank with internal coil, and by adding a heat exchanger to transfer sensible and latent heat from the heater flue gas to the pass-through water system.

SUMMARY OF THE INVENTION

Accordingly, the present invention provides a water heating apparatus with sensible and latent heat recovery comprising (a) an air pass-through system comprising an air inlet, an air outlet, an air flow path extending from the air inlet to the air outlet, and a burner positioned in the air flow path for burning hydrocarbon fuel in the presence of oxygen in the air flow path;

(b) a water pass-through system comprising a water inlet for receiving water to be heated from a main water supply, a water outlet for discharging heated water, a water flow path extending from the water inlet to the water outlet, and a first heat exchanger positioned in the water flow path and in the air flow path downstream of the burner, for transferring sensible and latent heat from gases in the air flow path to water in the water flow path;

(c) a closed system for a liquid comprising a closed circuit, and second and third heat exchangers in fluid communication with each other within the closed circuit, the second heat exchanger being positioned within the air flow path proximate to the burner for transferring heat from gases in the air flow path to liquid in the closed circuit, and the third heat exchanger being positioned within the water flow path downstream of the first heat exchanger for transferring heat from liquid in the closed circuit to water in the water flow path;

(d) a recirculating water conduit having intake and output openings in fluid communication with said water flow path and, together with said water flow path, establishing a water recirculation circuit, through which water may be recirculated continuously past the first and third heat exchangers; and (e) a control system comprising a mechanism operatively coupled to said systems and conduit for controlling air flow through said air pass-through system, water flow through said water pass-through system, liquid flow through said closed circuit, and water flow through said recirculating water conduit, a first fast response temperature sensor operatively connected to said water pass-through system for sensing the temperature of water flowing therethrough, a controller operatively coupled to said temperature sensor, burner, and mechanism and being adapted to interpret signals generated by the temperature sensor to determine whether there is a need to heat water in the water pass-through system and to respectively actuate the burner to heat air in the pass-through system and liquid in the closed system and recirculate water through the recirculating water conduit, when the need arises.

The advantage of this invention is that the efficiency of heating the pass-through water is increased by approximately 6% relative to the system taught in U.S. Pat. No. 5,881,952 to Macintyre.

BRIEF DESCRIPTION OF THE DRAWING

A preferred embodiment of a water heating apparatus according to the invention will now be described with reference to the drawing in which.

DETAILED DESCRIPTION OF PREFERRED EMBODIMENT

Figure 1:
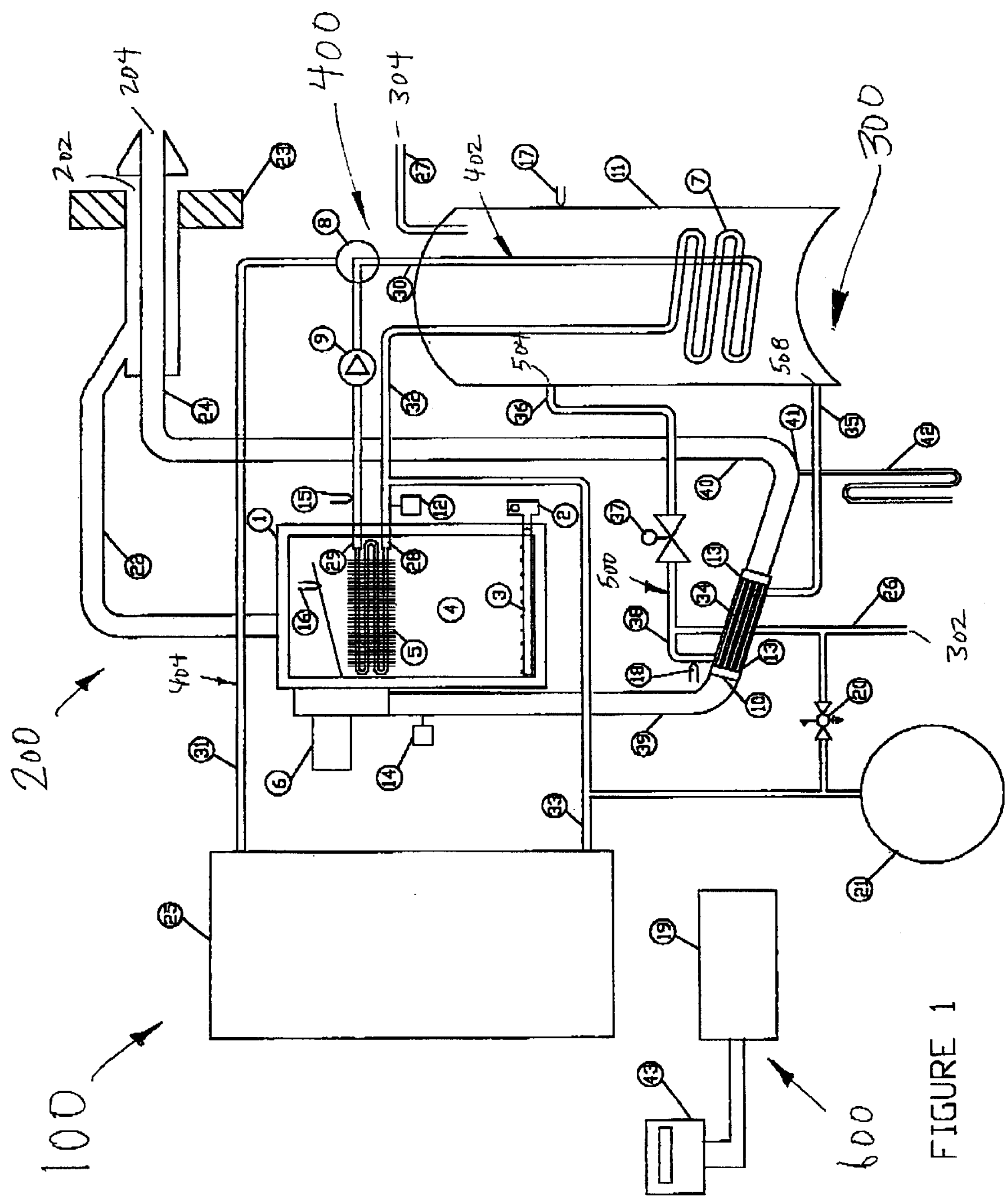
FIG. 1 is a schematic representation of the preferred embodiment.

Throughout the description and claims, the term "sensible heat" means heat transferred from flue gases without condensation of water vapor within the flue gases. The term "latent heat" means heat transferred by the condensation of water vapor within flue gases as measured by the quantity of water condensate collected. Furthermore, unless the context clearly requires otherwise, the words "comprise", "comprising" and the like are to be construed in an inclusive sense as opposed to an exclusive or exhaustive sense; that is to say, in the sense of "including, but not limited to".

Referring to FIG. 1, a hot water apparatus 100 with sensible and latent heat recovery according to the preferred embodiment of the invention is shown. The apparatus 100 includes an air pass through system 200, a water pass-through system 300, a closed system 400 for liquid, a recirculating water conduit 500 and a control system 600.

The air pass through system 200 comprises an air inlet 202, an air outlet 204, and an air flow path, through which air and other gases flow, from the air inlet 202 to the air outlet 204. The air flow path extends through, in series, the air inlet 202, an air intake 22, a primary water heater 1 in which is positioned a burner 3, a flue gas transfer tube 39, a first heat exchanger 10, a flue vent pipe 40, an exhaust pipe 24, and finally the air outlet 204. The gas burner 3 is positioned in the air flow path for burning hydrocarbon gas in the presence of oxygen in the air flow path. In an alternative embodiment, hydrocarbon oil may be used. Suitable hydrocarbon fuels for use by the burner 3 include propane and natural gas. The burner 3 is connected to a gas supply via a controllable gas valve 2. The air pass-through system also includes an airflow switch or pressure differential switch 14 to ensure safe combustion of the hydrocarbon gases. The air intake pipe 22 and exhaust pipe 24 extend outside the building through a wall 23 with the air inlets and outlets 202, 204 being co-axial. For domestic water heating systems, the air intake pipe 22 and the exhaust pipe 24 are preferably made of acrylonitrile-butadiene-styrene copolymer (ABS) resin. There may be flow control orifices in air intake pipe 22 and in flue gas transfer tube 39.

The water pass-through system 300 comprises a water inlet 302 for receiving water to be heated from a main water supply, a water outlet 304 for discharging heated water, and a water flow path extending from the water inlet 302 to the water outlet 304. The water flow path consists of, in series, the water inlet 302, a main water supply line 26, tube 38, a water passage extending through a first heat exchanger 10 to tube 35, tube 35, a first side wall opening 508 proximate the bottom of a storage tank 11, storage tank 11, water supply line 27 and water outlet 304. The tank 11 is used to store water in the water pass-through system 300. The heat exchanger 10 is positioned in the water flow path and in the air flow path downstream of the burner 3, for transferring sensible and latent heat from flue gases in the air flow path to water in the water flow path. To regulate water pressure in the water pass-through system 300 and keep the pressure within legislated maximums, a conventional expansion tank 21 is connected to the water supply line 26 via a conventional pressure relief and fill valve 20.

The heat exchanger 10 has eight internal parallel hollow tubes connected to two plates or headers 13, one at each end of the tubes. The headers 13 have openings coterminous with the openings at each end of the tubes so that fluid can flow through one header 13, through the hollow interior of the tubes, and out the other header 13. The tubes and headers 13 are encased in a cylindrical housing and a chamber is provided on either side of the headers 13 inside the housing. Thus, the chambers are in fluid communication the hollow interior of the tubes. A space for water extends between the headers 13 and around the exterior of the tubes. Flue gases pass from one chamber to the other through the hollow interior of the tubes, while water flows around the exterior of the tubes to absorb sensible and latent heat from the flue gases which condense inside the tubes. Although heat exchanger 10 has eight tubes, it will be appreciated that the number of tubes is variable within practical limits as will be apparent to the person skilled in the art.

The closed system 400 comprises first and second closed circuits 402, 404 containing liquid in the form of water, although other liquids, such as oils and glycols may be used. The first closed circuit 402 is used to heat water in the apparatus 100 and consists of, in series, a second heat exchanger in the form of a tube-and-fin heat exchanger 5, outlet tube 29 of the heat exchanger 5, pump 9, three-way valve 8, tube 30, a third heat exchanger in the form of a coiled tube 7, return table 32 and an inlet tube 28 to the tube-and-fin heat exchanger 5. The heat exchangers 5, 7 are in fluid communication with each other within the closed circuit 402. The tube-and-fin heat exchanger 5 is positioned within the air flow path proximate to the burner 3 for transferring heat from flue gases in the air flow path to water in the closed circuit, and the coiled tube 7 is positioned within the water flow path in the bottom of the tank 11 downstream of the first heat exchanger 10 for transferring heat from water in the closed circuit to water in the tank. A minimum flow sensor switch 12 is positioned in the inlet tube 28 for sensing the flow of liquid through the closed systems 402, 404, as will be described further below.

The second closed circuit 404 is used to heat rooms in buildings and comprises, in series, the tube-and-fin heat exchanger 5, outlet tube 29, pump 9, three-way valve 8, tube 31, a fourth heat exchanger in the form of space heaters 25 positioned in a room, return tube 33 and inlet tube 28. Typical space heaters are baseboard heaters, fan coils and in-floor coils. The tube-and-fin heat exchanger 5 and space heaters 25 are in fluid communication with each other within the second closed circuit 404 which meets the first closed circuit at a junction downstream of the tube-and-fin heat exchanger 5. A three-way valve 8 is positioned at the junction for use in regulating water flow either through the first closed circuit 402 or through the second closed circuit 404.

The recirculating water conduit 500 consists of tubes 38 and 36 which extend from an intake opening (not shown) to an outlet opening 504, both in fluid communication with the water flow path. Specifically, the intake opening communicates with a top opening of the heat exchanger 10 and the output opening 504 extends into the storage tank 11 through a second side wall opening in the side wall of the tank 11 spaced above the first side wall opening 508. A water valve 37 is positioned between the intake and output openings to regulate water flow through the water conduit 500. The recirculating water conduit 500, together with the water flow path, establishes a water recirculation circuit through which water may be recirculated continuously past the first and third heat exchangers 10, 7, as will be described further below.

The control system 600 enables the apparatus 100 to achieve a desired response and control and has an air thermostat 43 associated therewith. The control system also includes a conventional mechanism operatively coupled to the above systems 200, 300, 400, and water conduit 500 for controlling gas and liquid flow therethrough. This mechanism includes the exhaust fan 6, air flow or pressure differential switch 14, motorized valve 37, pump 9, three-way valve 8, pressure relief valve 20, and gas valve 2. The control system 600 also includes a first, second, third and fourth fast response temperature sensors in the form of thermocouples 18, 15, 17, 16, respectively. Thermocouple 18 is attached to the outside of the water conduit 500 by an insulated clamp and is situated close to the intersection of tube 38 with heat exchanger 10, and in close proximity to the flue gas path such that it will sense thermal gradients when a water draw at tube 27 is initiated, and when a water draw is terminated. Thermocouple 15 is attached to the outside of the outlet tube 29 by an insulated clamp to sense the temperature of liquid flowing through the closed circuits 402, 404. Thermocouple 17 is attached to the surface of the storage tank side-wall by soldering to sense the temperature of water stored in the tank 11. Finally, thermocouple 16 is mounted above heat exchanger 5 by conventional means to sense the temperature of gases within the heater 1. Instead of clamps, thermocouples 15 and 18 may also be mounted in position by soldering or the like. It is preferable that thermocouples 15,16,17 and 18 have a fast response time. The fast responsive time minimizes overshooting and undershooting of temperature control of the water systems. Thermocouples 16 and 17 may be replaced by high-resolution thermal switches. Temperature sensors based on bimetallic strips do not have a fast enough response time for the present invention. An example of a fast response thermocouple 18 is one in which initiation of ignition of hydrocarbon fluid occurs within about 10 seconds of the start of draw of water from the water pass-through system. The control system 600 further includes a controller 19 which has a processor operatively coupled to the thermocouples 15,16,17, and 18. The controller 19 is operatively coupled to and operates the burner 3 and mechanism in response to readings from the thermocouples. For example, the controller 19 is adapted to interpret signals from the thermocouple 18 to determine whether there is a need to heat water in the water pass-through system 300 and to respectively heat air in the air pass-through system 200 and recirculate water through the recirculating water conduit 500, when the need arises.

The operation of the apparatus 100 will now be described. The closed system 400 has two modes of operation, namely "water heating" and "space heating". In the "water heating" mode, water in the closed system 400 is cycled through the first closed circuit 402. In the "space heating" mode, water in the closed system 400 travels through the second closed circuit 404.

The water pass-through system 300 is open circuit having two modes of operation, namely "water draw" and "recirculation". In the "water draw" mode the water flows through the water flow path described above. Specifically, when the controller 19 senses water is being drawn from hot water supply line 27 it causes motorized valve 37 to close, resulting in cold supply water from main water supply line 26 to enter a top opening of the heat exchanger 10 via tube 38 and flow out of a bottom opening of the heat exchanger 10 through tube 35 and thence into the bottom of storage tank 11 such that the cold inflow of supply water is receiving heat from the flue gases which in turn condense and transfer sensible and latent heat to the water.

The controller 19 has the capability of sensing termination of the water draw from tube 27 and causes the water pass-through system to transfer to "recirculation" mode when there is no water draw and the gas valve 2 is open so that the burner is operating and the thermocouple 17 indicates that the temperature of water stored in the tank is less than an allowed maximum temperature. In the recirculation mode, water flows through tube 35 in an opposite direction to the direction of flow of water through the water flow path, in a recirculating water circuit including the water conduit 500. Specifically, water valve 37 is opened and cold water recirculates in the recirculating water circuit consisting of, in series, the storage tank 11, the first side wall opening 508, tube 35, the bottom opening of heat exchanger 10, water passage through the heat exchanger 10, the top opening of the heat exchanger 10, tube 38, tube 36 and the second side wall opening back to the storage tank 11. The recirculation of water is achieved without the use of a pump but by temperature gradients existing in the water stored in the tank 11 and by a recirculating water flow path extending generally upwardly from the first side wall opening 508 to the heat exchanger 10 and then to the second side wall opening. To facilitate recirculation of the water, the heat exchanger 10 is preferably tilted upwardly in the direction of flow of the recirculating water, as shown. As water is recirculated through the recirculating water circuit, flue gases condense in the heat exchanger 10 and transfer sensible and latent heat to the recirculating water. This serves to increase water heating thermal efficiency by approximately 6% relative to the prior art Macintyre system.

Air for use in combustion by burner 3 flows through the air flow path described above. While in the heater 1, the air flows to the burner 3 where it mixes with hydrocarbon gas and burns to produce flue gases in a flue 4 of the heater 1. The exhaust fan 6 vents the flue gases from the flue 4 past the tube-and-fin heat exchanger 5, through an opening in the heater 1, past the exhaust fan 6, and then through the first heat exchanger 10 where the flue gases condense thereby releasing both sensible and latent heat, which heat is transferred to water flowing through the first heat exchanger 10, as mentioned above.

If the output of gas valve 2 is substantially above that required for domestic hot water heating, there may be a need to modulate input to gas burner 3 in order to avoid excessive ON and OFF cycling of the gas valve. This may be accomplish by using a modulating output gas valve and a combustion fan equipped with a variable speed motor.

As mentioned above, when water is drawn from hot water supply line 27, fresh water is drawn into tube 38 from main water supply line 26. As this occurs there is a temperature drop in tube 38 adjacent to the heat exchanger 10. The temperature of the tube 38 is sensed by the thermocouple 18. In one control method, the controller 19 tracks the temperature registered by the thermocouple 18, and determines whether there has been a significant rate of temperature drop, e.g. 3° C. in 20 seconds. As a result of this temperature drop, the controller 19 switches on the pump 9, and the fan 6, and then causes the gas valve 2 to be opened. Preferably however, prior to doing so, the controller 19 determines if the minimum flow sensor switch 12 indicates a sufficient flow of water through inlet tube 28, and that switch 14 indicates a sufficient flow of combustion air. It will be understood that sensing sufficient water and airflow in this manner is primarily for safety purposes and for protecting the heat exchanger 5 and the associated fan 6 and exhaust tubes 39 and 40 from damage. After the valve 2 is open, hydrocarbon gas from gas burner 3 is burnt. As will be understood, the air necessary for combustion is drawn through the air intake 22. The resulting flue gases are drawn by the fan 6 to the exhaust pipe 24 via flue gas transfer tube 39, heat exchanger 10, and flue vent pipe 40. Any condensate collects at a tapping 41 in the flue vent pipe 40, and exits to drain through a vapor lock 42.

As mentioned above, combustion gases from the burner 3 heat water in the tube-and-fin heat exchanger 5. The water in such heat exchanger 5 is drawn from outlet pipe 29 by the pump 9. If, as described above, hot water is being drawn from supply line 27, three-way valve 8 is set by controller 19 to allow all water in tube 29 to flow through tube 30 and thence through coiled tube 7, tube 32 and so re-circulate via minimum flow valve 12 and inlet tube 28 to tube-and-fin heat exchanger 5. As the closed circuit water flows through tube 30, coiled tube 7 and tube 32, heat is exchanged with pass-through water in storage tank 11. Controller 19 controls gas valve 2 in order to keep the temperature of water, as sensed by thermocouple 15, in the closed circuit between two predetermined temperatures. For example, controller 19 may be set to control the temperature of water in the closed circuit system between about 68° C. and 85° C. This is done by controller 19 opening and closing gas valve 2 as appropriate. When the temperature of the water in the pass-through system, as determined by thermocouple 17 reaches the desired hot water temperature of water in the storage tank 11, e. g. about 57° C., controller 19 shuts off gas valve 2. Controller 19 also monitors the temperature in the flue gases as determined from thermocouple 16 and if the temperature exceeds a third predetermined temperature, gas valve 2 is closed. The third predetermined temperature is particularly required if the flue gas transfer tube 39 and flue vent pipe 40 are made of a combustion material such as ABS, so that the ABS is not melted or burned.

When there is a need to heat the room as determined by the temperature sensor 43, the controller 19 first determines if there is a simultaneous call for heat for the pass-through water system. If there is, the three-way valve 8 is positioned to supply water only to coiled tube 7 and the call for heating the room is ignored until the heating requirements for the pass-through water system are satisfied. Once satisfied, the controller 19 sets the three-way valve 8 to have water flow solely through tube 31 to the space heaters 25. The controller 19 again ensures that pump 9 and fan 6 are ON and that there is sufficient water flow as determined by minimum flow switch 12 and sufficient air flow as determined by air switch 14. Only then will controller 19 open gas valve 2 to operate the burner and heat the room.

Gas valve 2 will be opened and closed to keep the temperature of the water in the closed water system, as determined by thermocouple 15, between two predetermined set points, e.g. between about 68° C. and 85° C.

In a domestic hot water situation, many jurisdictions specify a maximum temperature to which water in a storage tank may be heated. In some jurisdictions the maximum temperature is about 57° C.; in others, it is 49° C. To accommodate requirements for different jurisdictions, the present control system may have a jumper or other means to alter the maximum temperature setting. When the flue gas transfer tube 39 and vent pipe 40 are made of ABS copolymer, the temperature of water in the closed circuit system is preferably no higher than about 85° C.

It will be appreciated that the foregoing description is by way of example only and various modifications may be made thereto without departing from the scope of the invention. For example, a pump may be positioned in the water recirculation circuit to recirculate water therethrough, rather using thermal gradients within the tank 11. Where a pump is used, the positioning of the tubes in the recirculation circuit may be varied. Furthermore, in the preferred embodiment, the third heat exchanger, consisting of coiled tube 7, is positioned in the storage tank 11. However, it will be appreciated that the third heat exchanger may be positioned outside of the tank 11 and a pump may be added to circulate the pass-through water between the external third heat exchanger and the storage tank 11. Thus, the foregoing description shall not be construed so as to limit the scope of the invention which is defined by the following claims.

I claim:

1. A water heating apparatus with sensible and latent heat recovery comprising (a) an air pass-through system comprising an air inlet, an air outlet, an air flow path extending from the air inlet to the air outlet, and a burner positioned in the air flow path for burning hydrocarbon fuel in the presence of oxygen in the air flow path;

(b) a water pass-through system comprising a water inlet for receiving water to be heated from a main water supply, a water outlet for discharging heated water, a water flow path extending from the water inlet to the water outlet, and a first heat exchanger positioned in the water flow path and in the air flow path downstream of the burner, for transferring sensible and latent heat from gases in the air flow path to water in the water flow path;

(c) a closed system for a liquid comprising a closed circuit, and second and third heat exchangers in fluid communication with each other within the closed circuit, the second heat exchanger being positioned within the air flow path proximate to the burner for transferring heat from gases in the air flow path to liquid in the closed circuit, and the third heat exchanger being positioned within the water flow path downstream of the first heat exchanger for transferring heat from liquid in the closed circuit to water in the water flow path;

(d) a recirculating water conduit having intake and output openings in fluid communication with said water flow path and, together with said water flow path, establishing a water recirculation circuit, through which water may be recirculated continuously past the first and third heat exchangers; and (e) a control system comprising a mechanism operatively coupled to said systems and conduit for controlling air flow through said air pass-through system, water flow through said water pass-through system, liquid flow through said closed circuit, and water flow through said recirculating water conduit, a first fast response temperature sensor operatively connected to said water pass-through system for sensing the temperature of water flowing therethrough, a controller operatively coupled to said temperature sensor, burner, and mechanism and being adapted to interpret signals generated by the temperature sensor to determine whether there is a need to heat water in the water pass-through system and to respectively actuate the burner to heat air in the air pass-through system and liquid in the closed system and recirculate water through the recirculating water conduit, when the need arises.

2. An apparatus according to claim 1 wherein said water pass-through system comprises a hot water tank for storing water, said tank being positioned in said water flow path downstream of said first heat exchanger, said third heat exchanger being positioned inside said tank.

3. An apparatus according to claim 2 wherein said tank has a bottom wall and a side wall extending upwardly from said bottom wall, said side wall having a first side wall opening proximate said bottom and a second side wall opening spaced above the first side wall opening, said first and second side wall openings being in fluid communication with said water flow path and said water recirculation circuit.

4. An apparatus according to claim 1 wherein said closed system comprises a second closed circuit, and a fourth heat exchanger in fluid communication with said second heat exchanger within said second closed circuit, said fourth heat exchanger being positioned in a room of a building for heating said room, said first and second closed circuits meeting at a junction downstream of said second heat exchanger, said control system comprising a three-way valve positioned at said junction, and said controller being adapted to operate said three-way valve to cause liquid to flow either through the first closed circuit or through the second closed circuit.

5. An apparatus according to claim 1 wherein said liquid is water.

6. An apparatus according to claim 1 wherein said air inlet and said air outlet are co-axial.

7. An apparatus according to claim 2 comprising a second fast response temperature sensor operatively connected to said closed system for sensing the temperature of liquid flowing therethrough, said controller being operatively connected to said second fast response temperature sensor and adapted to interpret signals emitted therefrom and to turn the burner on or off as required to maintain the temperature of liquid in the closed system within two predetermined points.

8. An apparatus according to claim 7 comprising a third fast response temperature sensor operatively connected to said tank for sensing the temperature of water stored therein, said controller being operatively connected to said third fast response temperature sensor and adapted to interpret signals emitted therefrom and to turn the burner on and off as required to maintain the temperature of water in the tank between two predetermined points.

9. An apparatus according to claim 8 comprising a fourth fast response temperature sensor operatively connected to said air pass-through system for sensing the temperature of air and gases flowing therethrough, said controller being operatively connected to said fourth fast response temperature sensor and adapted to interpret signals emitted therefrom and to turn the burner off as required to maintain the temperature of gases in the air pass-through system below a predetermined maximum.

10. A method of heating water comprising the steps of:

(a) providing an air pass-through system comprising an air inlet, an air outlet, an air flow path extending from the air inlet to the air outlet, and a burner positioned in the air flow path for burning hydrocarbon fuel in the presence of oxygen in the air flow path;

(b) providing a water pass-through system comprising a water inlet for receiving water to be heated from a main water supply, a water outlet for discharging heated water, a water flow path extending from the water inlet to the water outlet, and a first heat exchanger positioned in the water flow path and in the air flow path downstream of the burner, for transferring sensible and latent heat from gases in the air flow path to water in the water flow path;

(c) providing a closed system for a liquid comprising a closed circuit, and second and third heat exchangers in fluid communication with each other within the closed circuit, the second heat exchanger being positioned within the air flow path proximate to the burner for transferring heat from gases in the air flow path to liquid in the closed circuit, and the third heat exchanger being positioned within the water flow path downstream of the first heat exchanger for transferring heat from liquid in the closed circuit to water in the water flow path;

(d) a recirculating water conduit having intake and output openings in fluid communication with said water flow path and, together with said water flow path, establishing a water recirculation circuit, through which water may be recirculated continuously past the first and third heat exchangers; and (e) providing a control system comprising a mechanism operatively coupled to said systems and conduit for controlling air flow through said air pass-through system, water flow through said water pass-through system, liquid flow through said closed circuit, and water flow through said recirculating water conduit, a first fast response temperature sensor operatively connected to said water pass-through system for sensing the temperature of water flowing therethrough, a controller operatively coupled to said temperature sensor, burner, and mechanism and being adapted to interpret signals generated by the temperature sensor to determine whether there is a need to heat water in the water pass-through system and to respectively actuate the burner to heat air in the air pass-through system and liquid in the closed system and recirculate water through the recirculating water conduit, when the need arises;

(f) interpreting signals generated by the temperature sensor to determine whether there is a need to heat water in the second pass-through system; and (g) actuating the burner and water flow regulator to respectively heat air in the first pass-through system and recirculate water through the recirculating water conduit, when the need arises.

* * * * *